Patented Sept. 5, 1922.

1,428,086

UNITED STATES PATENT OFFICE.

JAMES H. GRAVELL, OF ELKINS PARK, PENNSYLVANIA.

PAINT FOR AND METHOD OF PREVENTING HEATED SURFACES FROM RUSTING.

No Drawing. Application filed June 4, 1921. Serial No. 475,168.

*To all whom it may concern:*

Be it known that I, JAMES H. GRAVELL, a citizen of the United States, residing at Elkins Park, in the county of Montgomery and State of Pennsylvania, have invented a new and useful Improvement in Paint for and Methods of Preventing Heated Surfaces from Rusting, of which the following is a specification.

This invention relates to improvements in coatings for metals and it is particularly directed to coatings for metals which are subjected to high degrees of heat.

One object of the invention is to provide a process and a material for preventing metals, that are occasionally heated and cooled, from rusting. Although the invention has a wide field of application, it is especially useful for preventing the exhaust manifolds of automobiles from rusting.

It is well known that paints, varnishes, japans and the like (which will be hereinafter called "paint") are not serviceable in protecting metals from rusting when the surfaces are subjected to high temperatures, and this is mainly due to the fact that the binder or vehicle used is decomposed by the heat and therefore its properties of holding the pigments and protecting the surface are destroyed.

I have found that the addition of a thermally decomposable phosphate to paint obviates the above mentioned defects and disadvantages and produces a decidedly beneficial result. The action of the phosphate may be described as follows: A temperature high enough to decompose the vehicle also decomposes the phosphate liberating phosphoric acid which is not driven off by the heat and which takes the place of the vehicle and holds the pigments in place. Moreover the phosphoric acid slowly acts on the metal and produces a coating which prevents the metal from rusting. As the phosphoric acid acts on the metal forming the coating it loses its vehicle properties and the pigments finally drop off but not until the coating has been produced.

In selecting a paint to be used with a phosphate decomposible by heat it is well to select one in which the various ingredients are compatible with the phosphate and in which the pigments are not affected by high temperature. An example of a suitable paint has the following formula:

| | |
|---|---|
| Spirit opal | 12 pounds |
| Alcohol which may be denatured | 4.50 gallons |
| Graphite | 10 pounds |
| Lamp black | 1.25 pounds |

If to the paint a thermally decomposable phosphate is added such as ammonium phosphate or aniline phosphate, the painted surface may be raised to a red heat without danger of burning off the coating. An example of proportions follows:

| | |
|---|---|
| Spirit copal | 12 pounds |
| Alcohol which may be denatured | 4.50 gallons |
| Graphite | 10 pounds |
| Lamp black | 1.25 pounds |
| Mono ammonium phosphate | 20 pounds |

A good way to make the above paint is to dissolve the spirit copal in the alcohol and then add the graphite, lamp black and phosphate and grind the admixture in a paint machine.

The paint thus produced may be applied to the metal by brushing, spraying or dipping and it produces when dry a dull black finish which remains practically unaltered in appearance if subjected to a red heat.

Of course if the appearance of the work is of no moment, the pigments in the paint may be omitted and only the phosphate and the vehicle applied to the work, and in that case the application of heat to the work will cause it to darken or otherwise change its appearance.

The quantity of the phosphate contained in the paint may be altered to a great extent, without departing from the spirit of the invention, and the kind of paint to which the phosphate, decomposable by heat, is added is subject to wide variation as will be readily understood by those skilled in the art.

I claim:

1. A paint for preventing heated metal surfaces from rusting of which one ingredient is a thermally decomposable phosphate in sufficient quantity more than 15% by weight to liberate enough phosphoric acid to form with the metal a substantial coating of phosphoric salts of the metal.

2. A paint for preventing heated metal surfaces from rusting containing a vehicle, a pigment, and a thermally decomposable phosphate in sufficient quantity more than 15% by weight to liberate enough phosphoric acid to form with the metal a substantial coating of phosphoric salts of the metal.

3. A paint for preventing heated metal surfaces from rusting containing varnish, graphite and mono ammonium phosphate in sufficient quantity more than 15% by weight to liberate enough phosphoric acid to form with the metal a substantial coating of phosphoric salts of the metal.

4. A paint for preventing heated metal surfaces from rusting containing varnish, graphite, lamp black and mono ammonium phosphate in sufficient quantity more than 15% by weight to liberate enough phosphoric acid to form with the metal a substantial coating of phosphoric salts of the metal.

5. The method of preventing metal from rusting which consists in treating it with a thermally decomposable phosphate and then heating the metal to liberate phosphoric acid.

6. The method of preventing metal from rusting which consists in treating it with a paint of which one ingredient is a thermally decomposable phosphate, and then heating the metal to cause the liberation of phosphoric acid.

7. The method of preventing metal from rusting which consists in treating it with an admixture of mono ammonium phosphate, varnish, graphite and lamp black, allowing the admixture to dry on the metal, and then heating the metal to liberate phosphoric acid.

JAMES H. GRAVELL.